United States Patent
Gleize et al.

(10) Patent No.: US 12,146,738 B2
(45) Date of Patent: Nov. 19, 2024

(54) DEVICE FOR CHECKING ARMOR

(71) Applicant: SAINT-GOBAIN CENTRE DE RECHERCHES ET D'ETUDES EUROPEEN, Courbevoie (FR)

(72) Inventors: Vincent Gleize, Robion (FR); Alexane Margossian, Pernes-les-Fontaines (FR); Matthieu Graveleau, Avignon (FR); Mickael Boinet, Maubec (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 0 days.

(21) Appl. No.: 17/784,920

(22) PCT Filed: Dec. 10, 2020

(86) PCT No.: PCT/EP2020/085638
§ 371 (c)(1),
(2) Date: Jun. 13, 2022

(87) PCT Pub. No.: WO2021/116349
PCT Pub. Date: Jun. 17, 2021

(65) Prior Publication Data
US 2023/0011664 A1    Jan. 12, 2023

(30) Foreign Application Priority Data

Dec. 11, 2019 (FR) .................................... 1914138

(51) Int. Cl.
*G01B 7/16* (2006.01)
*F41H 1/02* (2006.01)
(Continued)

(52) U.S. Cl.
CPC ................. *G01B 7/18* (2013.01); *F41H 1/02* (2013.01); *F41H 5/04* (2013.01); *G01L 1/06* (2013.01);
(Continued)

(58) Field of Classification Search
CPC . G01L 1/06; G01L 1/22; G01L 1/2287; G01L 5/0052; G01B 7/18; F41H 1/02;
(Continued)

(56) References Cited

U.S. PATENT DOCUMENTS

2005/0158551 A1\* 7/2005 Rhoads ................. C01B 32/162
428/408
2009/0282671 A1\* 11/2009 Tao ........................ H05K 1/095
29/621.1
(Continued)

FOREIGN PATENT DOCUMENTS

EP    2129991 B1    5/2013
EP    3128306 A2    2/2017
(Continued)

OTHER PUBLICATIONS

Allen et al. "Deformation behaviour or Kevlar aramid fibres", available online at https://www.sciencedirect.com/science/article/pii/0032386189900694 (Year: 1988).\*
(Continued)

*Primary Examiner* — Benjamin R Schmitt
(74) *Attorney, Agent, or Firm* — Ronald M. Kachmarik; Cooper Legal Group LLC

(57) ABSTRACT

A device that includes a piece of armor made from a material that has a domain of plastic deformation under bad before breaking and an elastic deformation domain. The plastic deformation domain represents less than 1% of the elastic deformation domain. The device includes a deformation sensor fixed to the piece of armor and configured to deform (Continued)

plastically under the effect of at least a stress applied to the piece of armor and leading to damage of the piece of armor.

23 Claims, 7 Drawing Sheets

(51) Int. Cl.
    *F41H 5/04*     (2006.01)
    *G01L 1/06*     (2006.01)
    *G01L 1/22*     (2006.01)
    *G01L 5/00*     (2006.01)
    *F41J 5/04*     (2006.01)

(52) U.S. Cl.
    CPC .............. *G01L 1/22* (2013.01); *G01L 1/2287* (2013.01); *G01L 5/0052* (2013.01); *F41J 5/04* (2013.01)

(58) Field of Classification Search
    CPC ........ F41H 5/04; F41H 5/0414; F41H 5/0428; F41H 5/0471
    See application file for complete search history.

(56) References Cited

U.S. PATENT DOCUMENTS

| | | |
|---|---|---|
| 2012/0144934 A1 | 6/2012 | Russell et al. |
| 2012/0198593 A1* | 8/2012 | Beck .......................... F41J 5/04 |
| | | 2/2.5 |
| 2013/0043888 A1 | 2/2013 | Soar |
| 2018/0195914 A1 | 7/2018 | Benech et al. |

FOREIGN PATENT DOCUMENTS

| | | |
|---|---|---|
| JP | H095175 A | 1/1997 |
| WO | 2017009256 A1 | 1/2017 |

OTHER PUBLICATIONS

International Search Report corresponding to International Application No. PCT/EP2020/085638, dated Feb. 11, 2021, 7 pages.

* cited by examiner

[Fig 1]
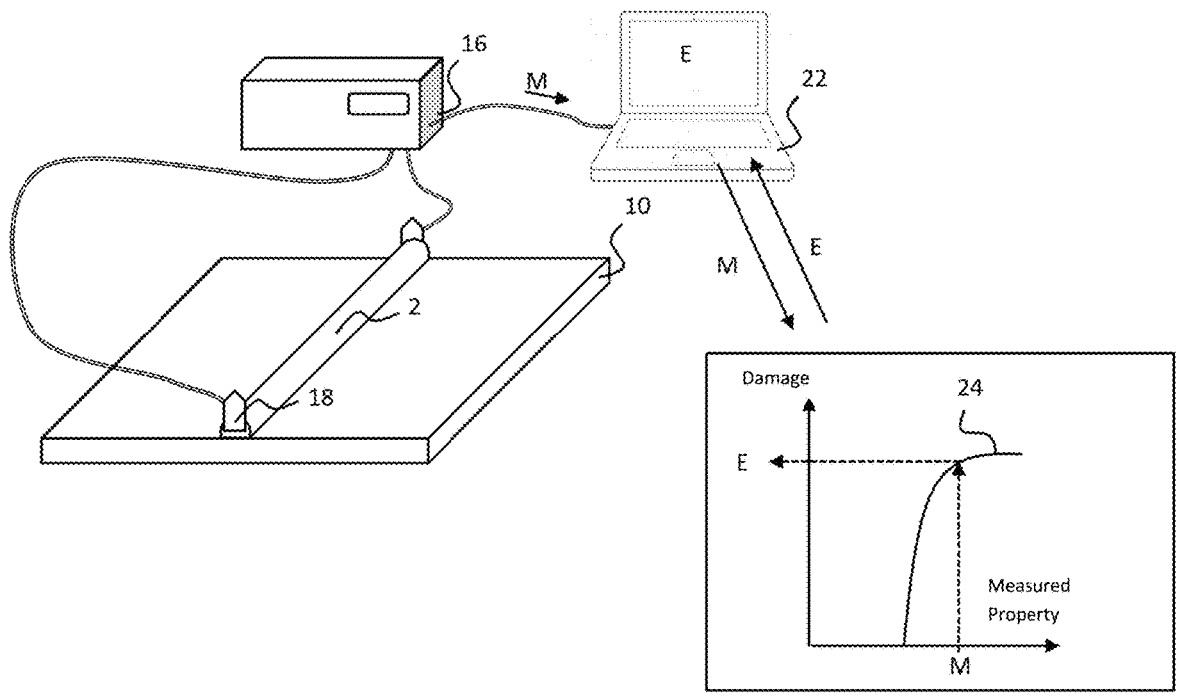

[Fig 2]
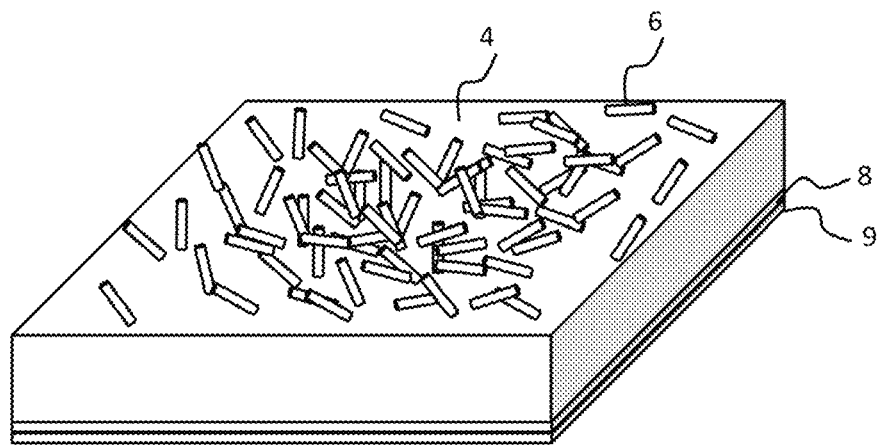
[Fig 3]
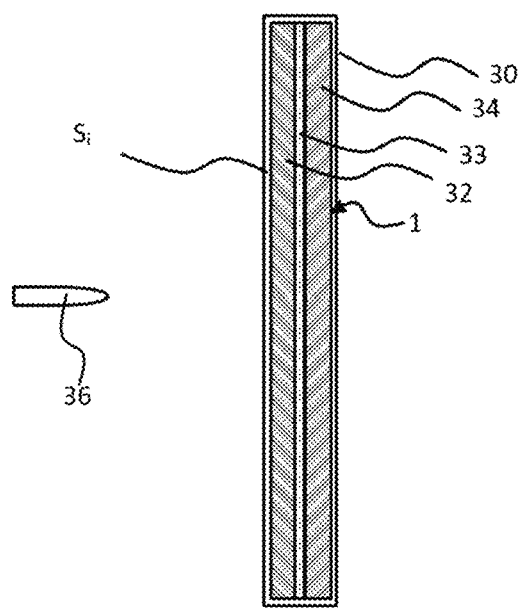

[Fig 4]
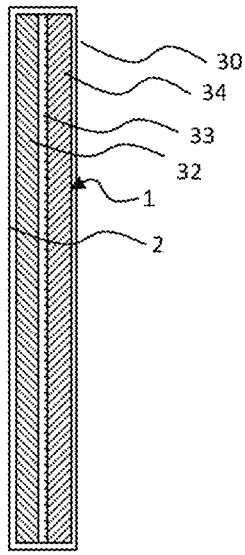
4A
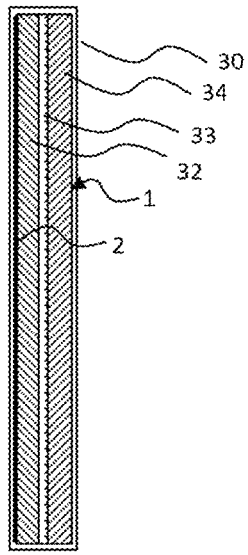
4B
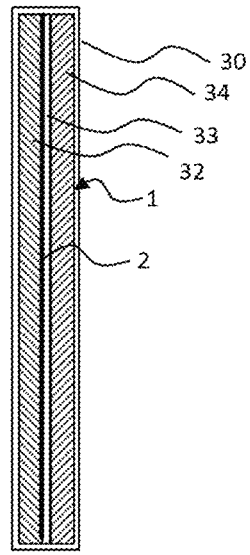
4C
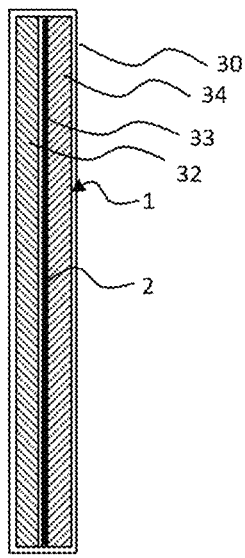
4D
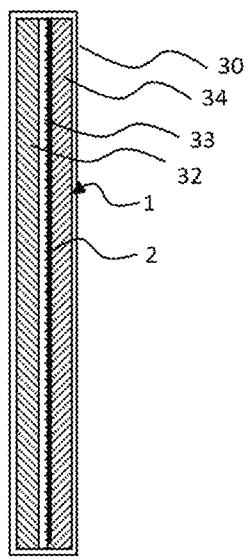
4E

[Fig 5] AMENDED
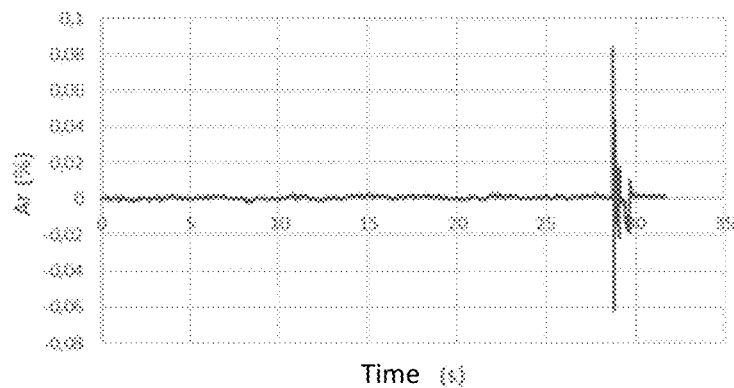
5A
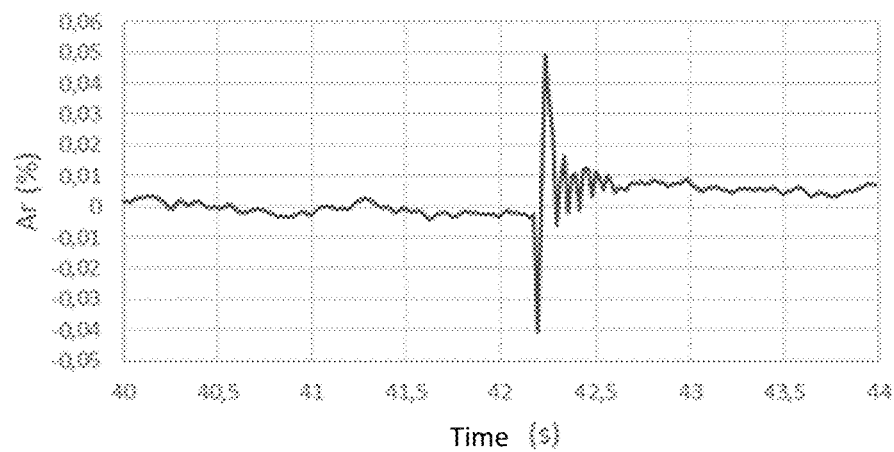
5B
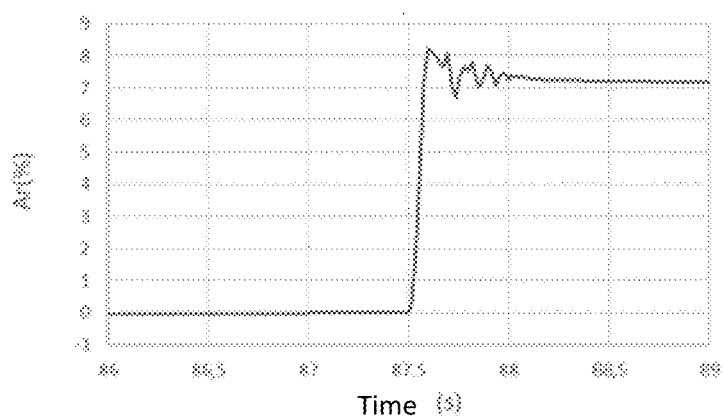
5C

[Fig 6]
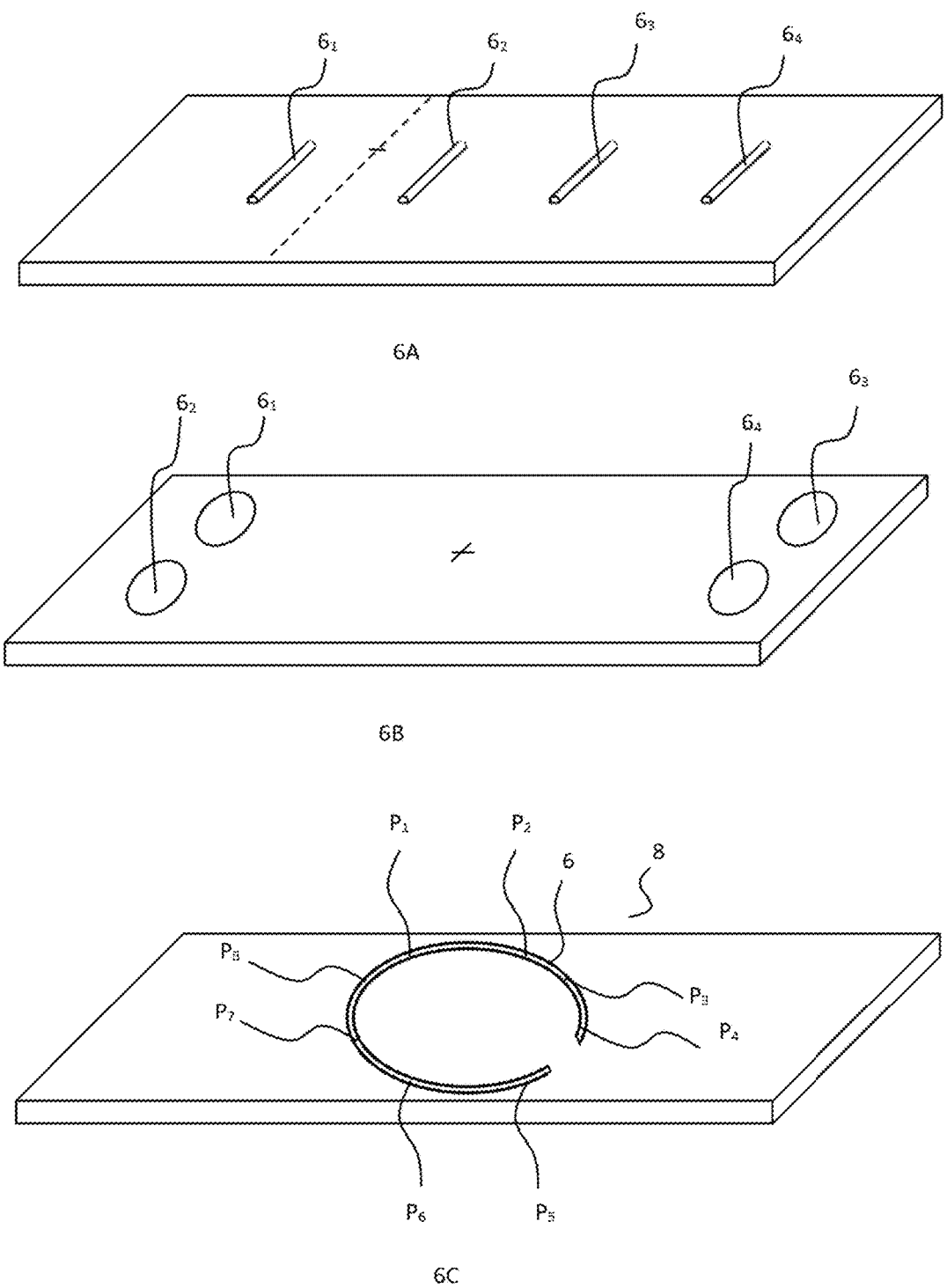

[Fig 7]
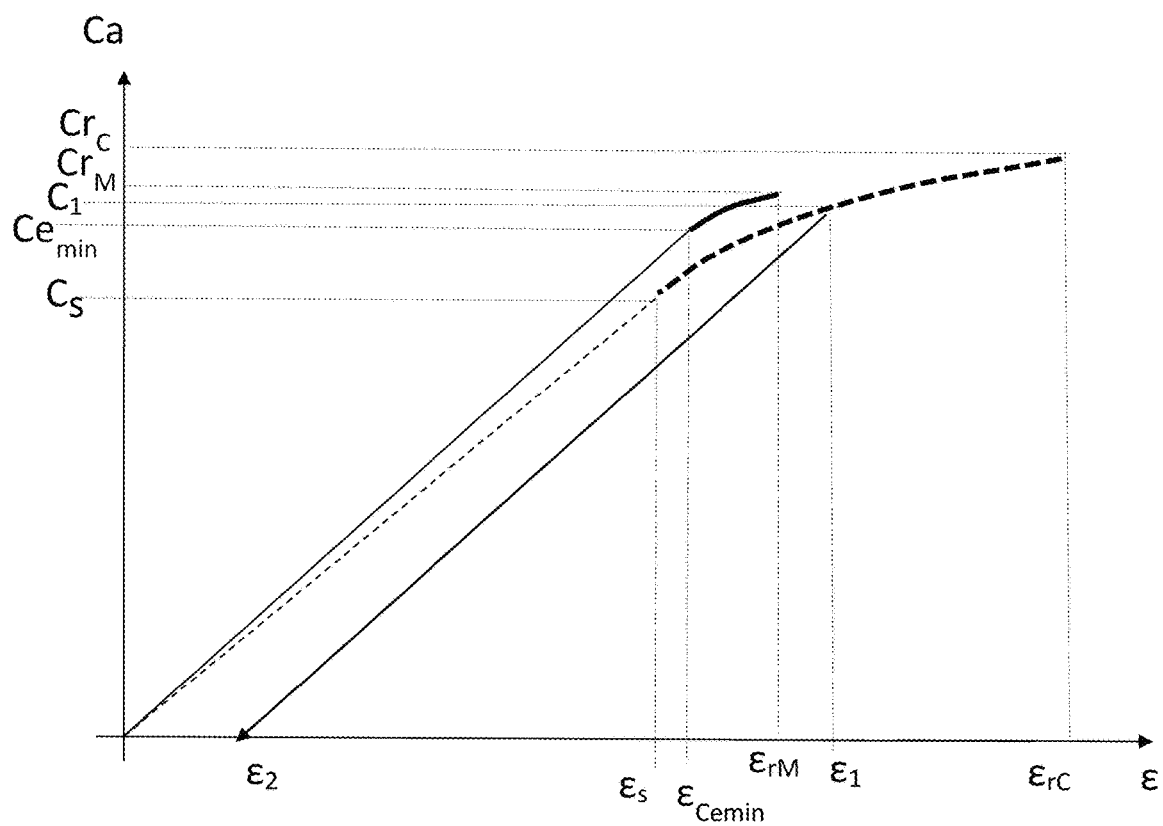

[Fig 8]
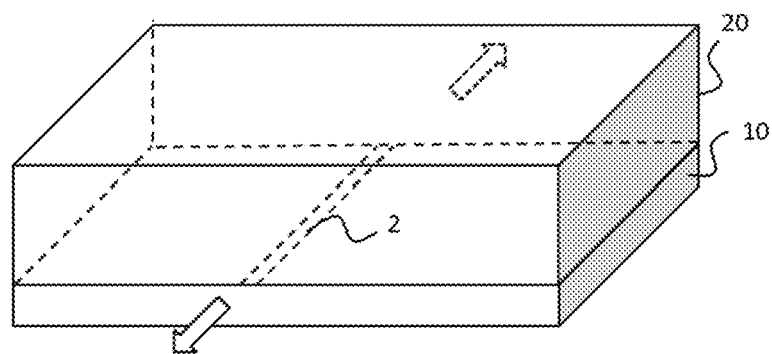

DEVICE FOR CHECKING ARMOR

TECHNICAL FIELD

The invention relates to a device and a method for checking the physical condition of armor, particularly of armor used for a bulletproof vest or for protecting a military vehicle.

PRIOR ART

Conventionally, a bulletproof vest comprises a protective shield made up of:
- a protective plate 1 consisting of a sandwich made up successively of an armor plate 32, of an intermediate layer 33 and of a shock absorbing plate 34 referred to as "backing", and
- an outer cover 30 covering the protective plate (FIG. 3).

The armor plate is bonded to the intermediate layer which is itself bonded to the shock absorbing backing plate. The cover may also be bonded to the protective plate.

The armor plate is conventionally made of a ceramic material, typically alumina, SiC or $B_4C$.

The intermediate layer is a textile, typically a material selected from polyethylenes PE, notably ultrahigh density polyethylenes (UHMWPE), glass fiber or carbon fiber, aramids, metal such as aluminum, titanium or alloys thereof and steel.

The shock-absorbing backing plate 34 is made of a ductile material, typically
- of a fibrous material consisting mainly of polyethylene fibers, for example made of Tensylon™, Dyneema® or Spectra™, aramid fibers, for example Twaron™, Kevlar®, glass fibers, or
- of a metal, for example of steel or an aluminum alloy.

The cover is conventionally a fabric, for example made of glass or carbon fibers.

It may notably be made of a material selected from polyethylenes PE, notably ultrahigh density polyethylenes (UHMPE), aramids, particularly Kevlar®, metals such as aluminum or even steel, particularly in the case of non-personal protective equipment.

The adhesive may for example be based on polyurethane or epoxy polymers.

In the service position, which is to say when the bulletproof vest is being worn, the shock-absorbing backing plate extends on the side of the wearer of the bulletproof vest. The shock caused by a projectile therefore reaches the armor plate first, then the shock-absorbing backing plate.

In order to check that the protective plate is in good condition, the overall appearance of the cover is conventionally examined. Signs of potential damage to the armor plate are actually often very difficult to detect. In a brittle material such as the material of which the armor plate is conventionally made, brittle fracture or "catastrophic failure" may actually be the result of the proliferation of microcracking which is difficult to detect. It is therefore possible that the wearer might not be correctly protected.

There is therefore a need for a more reliable method for monitoring the condition of a bulletproof vest, and more generally of a piece of brittle armor, without the need to resort to complex investigative techniques such as radiographic techniques, for example.

It is an object of the invention to at least partially meet this need.

DESCRIPTION OF THE INVENTION

SUMMARY OF THE INVENTION

The invention proposes a device including a piece of armor and a deformation sensor fixed to the piece of armor, the deformation sensor being configured to deform plastically under the effect of at least a stress applied to the piece of armor and that causes damage to the piece of armor, preferably under the effect of a minimum damaging stress for the piece of armor, which is to say under the effect of the smallest stress applied to the piece of armor that leads to damage of the piece of armor.

It will be noted that stresses refer to the piece of armor, whereas the deformation refers to the deformation sensor.

As will be seen in greater detail later on in the description, the deformation sensor therefore deforms plastically under the effect of a stress that has caused damage to the piece of armor, without breakage of the deformation sensor or of the piece of armor. When this stress ceases to be applied, the deformation sensor therefore maintains a residual deformation (permanent set) making it possible to identify that the piece of armor has experienced said stress. This physical memory of the occurrence of the damaging stress is particularly advantageous because it allows the piece of armor to be monitored discontinuously over time and with greater autonomy. Unlike a damage check performed by means of conventional strain gauges, there is no need to continuously measure the deformation of the deformation sensor.

The deformation sensor is preferably configured to deform under the effect of a stress applied to the piece of armor,
- elastically when the applied stress Ca is less than or equal to a threshold stress Cs, and plastically when the applied stress is greater than the threshold stress,
- the threshold stress being such that $Cs<Ce_{min}$ and, for preference $(Ce_{min}-Cs)/Cs<20\%$,
- $Ce_{min}$ being the minimum damaging stress for the piece of armor, which is to say the smallest applied stress that leads to damage to the piece of armor.

As will be seen in greater detail later on in the description, the deformation sensor therefore deforms elastically when the stress applied to the piece of armor is low and far removed from the minimum damaging stress, which is to say typically in the absence of any shock to the piece of armor. When the stress ceases to be applied, the device therefore returns to its initial geometry.

However, the threshold stress, which corresponds to the plastic limit of the deformation sensor, is less than or equal to the minimum damaging stress $Ce_{min}$. A, preferably any, stress applied to the piece of armor and which constitutes a damaging stress, which is to say a stress higher than the minimum damaging stress, therefore produces plastic deformation of the deformation sensor. The deformation sensor thus maintains a trace of the application of a damaging stress.

Of course, this entails the deformation sensor being functional when this stress higher than the minimum damaging stress has been applied to the piece of armor. In other words, the rupture limit, which marks the end of the domain of plastic deformation of the deformation sensor is not reached before the piece of armor is damaged.

Furthermore, measuring the plastic deformation advantageously makes it possible to evaluate the amplitude of the damaging stress, and therefore the extent of the damage to the piece of armor.

In order to avoid the deformation sensor deforming plastically when the piece of armor has not experienced any damaging stress, it is preferable for the threshold stress to be as close as possible to the minimum damaging stress.

As a preference, $(Ce_{min}-Cs)/Cs<10\%$, preferably $(Ce_{min}-Cs)/Cs<5\%$, and preferably $(Ce_{min}-Cs)/Cs<1\%$.

As a preference, the minimum damaging stress is the stress beyond which the piece of armor begins to experience microcracking.

The stress may be a mechanical stress, particularly resulting from a mechanical shock experienced by the piece of armor.

As a preference, the deformation sensor is configured not to be destroyed by the application of any stress to the piece of armor that does not lead to breakage of this armor. In other words, the deformation sensor remains operational as long as the stress applied to the piece of armor does not lead to breakage of the piece of armor.

In one embodiment, which is not preferred, the deformation sensor is destroyed before the piece of armor. The stress applied to the piece of armor and that defines the upper limit of the domain of plastic deformation of the deformation sensor, namely the breaking stress of the deformation sensor is denoted $Cr_c$. The deformation sensor is therefore configured to deform plastically under the effect of a stress applied to the piece of armor when the stress applied is greater than the threshold stress and less than the breaking stress $Cr_c$ that causes the deformation sensor to break. In order for the deformation sensor to remain functional when the minimum breaking stress $Ce_{min}$ has been applied to the piece of armor, it is necessary that $Ce_{min}<Cr_c$.

In an embodiment which is not preferred, $Cs \geq Ce_{min}$. The deformation sensor can then be used to detect only damage to the piece of armor that exceeds the smallest amount of damage.

A device according to the invention may further comprise one or more of the following optional features:
- the piece of armor is made of a ceramic material and/or of a glass and/or of a vitreous ceramic and/or of a ceramic matrix composite (CMC) and/or of a ceramic-metal composite;
- the deformation sensor has a property, preferably an impedance, preferably an acoustic and/or an electric impedance, preferably at least an electric resistance, that can vary according to its geometry, and in particular that can vary according to said applied stress Ca;
- the deformation sensor forms an electrically conducting circuit closed on itself and having no source of electrical energy;
- the deformation sensor includes, or consists of, a sensor matrix, preferably of polymer, and electrically conducting particles, preferably carbon particles, preferably carbon nanotubes, distributed in the sensor matrix;
- the collection of electrically conducting particles constitute a conducting network of which an electrical property, preferably the impedance, preferably the electrical resistance, preferably exclusively the electrical resistance, is dependent on an arrangement of the conducting particles that make up the conducting network, said arrangement being "modifiable" insofar as, under the effect of a stress applied to the brittle component, the arrangement of the conducting particles of the conducting network is modified so that this results in a modification to said electrical property of the conducting network;
- the sensor matrix has the form of a layer or of several superposed layers;
- the applied stress is a mechanical shock;
- the sensor matrix is made of a ceramic material;
- the sensor matrix is fixed to a support;
- the support is fixed to an interface layer, preferably so as to constitute a patch;
- the interface layer is fixed to the piece of armor, the interface layer being configured to deform under the effect of the stress Ca applied to the piece of armor; elastically when the applied stress Ca is less than or equal to the threshold stress Cs, and plastically when the applied stress Ca is greater than the threshold stress Cs;
- the interface layer is an "interfacing" adhesive, preferably selected from among thermosetting polymer adhesives, preferably selected from among polyurethane adhesives and/or epoxy adhesives, or is even a geopolymer-based adhesive;
- the interface layer has a thickness less than 2 mm, preferably less than 1 mm, preferably comprised between 0.1 and 1 mm;
- the interface layer preferably extends in such a way as to cover the entire surface of the support, particularly the support of the patch, facing the piece of armor;
- the deformation sensor comprises a patch of the type described in WO2017/009256 and an interface adhesive, by means of which the patch is bonded to the piece of armor;
- the device comprises a second piece, for example a shock-absorbing backing plate, and the deformation sensor is fixed to the piece of armor and to said second piece;
- the second piece is a shock-absorbing backing plate of a bulletproof vest or an intermediate layer extending between a shock absorbing backing plate of a bulletproof vest and the piece of armor;
- the device is a device affording protection against military projectiles and, in particular, against bullets, preferably intended for protecting a vehicle, particularly a military vehicle, or an individual, and preferably selected from among a bulletproof vest and a helmet, the piece of armor preferably being in the form of a plate.

The invention also proposes a method for monitoring the physical condition of a piece of armor, said method comprising the following steps:
1) at an initial instant, fixing a deformation sensor to the piece of armor so as to form a device according to the invention;
2) calibrating the device so as to determine a relationship between said physical condition and a property of the deformation sensor;
3) at an updated instant, measuring said property and, from said relationship, determining said physical condition at the updated instant.

Step 3) can be repeated, two successive updated instants being separated for example by more than 1 minute, 1 hour, a day, or a week, and/or less than 6 months or less than 1 month.

A method according to the invention may further include one or more of the following optional features:
- said property is an impedance, preferably a resistance;
- said physical condition relates to the presence of microcracking;

in step 3), said property is measured without contact with said deformation sensor;

in step 3), according to said measurement of said property:
- a mechanical shock experienced, prior to step 3), by the piece of armor, for example while said piece of armor is being transported, is detected and/or an amplitude of said mechanical shock is measured and/or a location of the zone of application of said mechanical shock is determined; and/or
- a thermomechanical shock experienced, prior to step 3), by the piece of armor is detected and/or an amplitude of said thermomechanical stress is measured and/or a location of the zone of application of said thermomechanical stress is determined; and/or
- a failure of the deformation sensor is detected; and/or
- detachment of the piece of armor from another piece to which it is fixed is detected, the deformation sensor being sandwiched between the piece of armor and said other piece.

The invention further relates to a kit, particularly for implementing a monitoring method according to the invention, said kit including a device according to the invention and measurement apparatus suitable for measuring, preferably contactlessly, said property in step 3).

DEFINITIONS

A "plate" is a name given to a piece of which the width is greater than five times the thickness.

A "stress" means stressing applied to a piece of armor, for example mechanical stressing such as a shock, thermal or thermomechanical stressing, chemical or corrosive stressing, a force or a moment of force. A stress may have a temporary or permanent effect on the piece of armor. By extension, a "stress" is the name given to the intensity of this stressing with respect to the area of the piece concerned. The stresses Ca, Cs and $Ce_{min}$ are applied in the same way to the piece of armor. For example, if the stress is a mechanical action, this action is applied to the same point on the piece of armor, in the same direction, the only potential difference between Ca, Cs and $Ce_{min}$ being the intensity of this action.

"The physical condition" of a piece of armor may for example be "damaged condition" or "intact condition". It may also be more precise. For example it may be "slightly damaged", "moderately damaged" or "highly damaged" condition.

The "damage" to a piece of armor is an irreversible consequence of the application of a stress to the piece of armor. The damage may in particular be manifested in the form of microcracking.

Any stress that causes damage is referred to as a "damaging stress".

The damaging stress of lowest intensity is referred to as the "minimum damaging stress".

A "property" of a deformation sensor means a characteristic of this sensor that can vary according to the geometry of said sensor. Conventionally, the property of the sensor, for example the impedance thereof, can be measured electrically.

Unless indicated to the contrary, the "resistance" is an electrical resistance measured in ohms.

When the deformation sensor breaks, it is conventionally not considered that it deforms plastically.

What is meant by "brittle" is a material for which the domain of plastic deformation under load before rupturing represents less than 1% of the elastic deformation domain, and is preferably substantially nil. In other words, the width of the range of stresses leading to plastic deformation without rupture represents less than 1% of the width of the range of stresses leading to elastic deformation.

A material may be composite or monolithic according to whether or not it contains fibers. In particular, it may be a "ceramic matrix composite" or "CMC", which is to say a product made up of fibers bound together by a ceramic matrix.

In the case of a monolithic material, the load applied in order to measure the deformability is typically a compressive load. In the case of a ceramic composite, for example a CMC, the load is applied in tension, the elongation then being measured in the direction of the fibers.

What is meant by a "ceramic material" is any nonmetallic and inorganic material. Diamond, graphite, graphene, carbide and cermet being considered here to be ceramic materials.

"Include", "have" or "comprise" are to be interpreted broadly and nonlimitingly.

BRIEF DESCRIPTION OF THE DRAWINGS

Further features and advantages of the invention will become further apparent from reading the detailed description which follows and from studying the attached drawings in which:

FIG. 1 schematically illustrates a kit according to the invention including a device according to the invention according to a first embodiment;

FIG. 2 schematically illustrates a device according to the invention according to a second embodiment;

FIG. 3 schematically depicts, in cross section, a ballistic protection shield of the prior art;

FIG. 4 schematically depicts, in cross section, various ballistic protection shields according to the invention;

FIG. 5 depicts the results of various tests with various ballistic protection shields according to the invention;

FIG. 6 depicts various devices according to the invention allowing the location of the zone of impact of shocks on the piece of armor to be evaluated;

FIG. 7 schematically illustrates the operation of a device according to the invention;

FIG. 8 schematically illustrates a device according to the invention used for detecting a relative shift between two pieces.

In the various figures, identical references are used to denoted members that are identical or analogous.

DETAILED DESCRIPTION

Device

A device according to the invention of the type depicted in FIG. 1 comprises a deformation sensor 2 and a piece of armor 10 to which the deformation sensor is fixed.

The deformation sensor can be arranged within the core and/or on the surface of the piece of armor.

As a preference, the deformation sensor is positioned in such a way as not to be subjected directly to the stresses applied to the piece of armor and, in particular, in such a way as to not receive direct impact from the projectiles likely to be fired at the piece of armor in service.

However, the deformation sensor needs to be arranged in such a way as to be deformed under the effect of the stresses applied to the piece of armor. An arrangement on the most vulnerable parts of the piece of armor, for example corners and edges, may be satisfactory.

Piece of Armor

The piece of armor 10 is made of a brittle material, preferably a ceramic material, preferably made of alumina, SiC or $B_4C$.

The piece of armor 10 may have a mass in excess of 500 g, preferably in excess of 1 kg and/or less than 100 kg, less than 50 kg, less than 10 kg, or even less than 5 kg.

The piece of armor 10 may have any shape which is determined according to the target application. The piece of armor 10 may in particular take the form of a plate, for example the form of a plate with a length in excess of 20 cm and/or less than 50 cm, a width in excess of 10 cm an/or less than 30 cm and a thickness greater than 5 mm, preferably greater than 10 mm and/or less than 2 cm.

The shape of the surface to which the deformation sensor is fixed is nonlimiting. It may be smooth or rough, have through-holes or be continuous, and optionally have cavities or bumps, be a developing surface or not, and may or may not be flat. As a preference, this surface is flat.

Deformation Sensor

A deformation sensor 2 is a sensor capable of supplying electrical information according to its geometry. The geometry of the deformation sensor may in particular be the result of it being crushed, stretched, flexed and/or twisted.

The deformation sensor 2 preferably comprises a sensor matrix 4 in which electrically conducting particles or "nanofillers" 6 are dispersed as illustrated in FIG. 2. The sensor matrix thus filled with conducting particles has an electrical behavior that differs according to its geometry.

The nanofillers 6 may be nanofillers described in WO2017/009256. The nanofillers may be carbon particles, preferably carbon nanotubes.

The concentration of nanofillers in the sensor matrix is preferably determined so that under the effect of a stress exerted on the piece of armor, the sensor matrix deforms, thus modifying the number and/or quality of contacts between the nanofillers, and therefore modifying the impedance, and in particular the electrical resistivity, of the sensor matrix.

The modification of the impedance is dependent on the concentration and shape of the nanofillers. Simple measurements of resistance as a function of deformation, for a nanofiller powder, enable a nanofiller concentration suited to the target application to be determined.

More specifically, the deformation sensor 2 has an elastic behavior as long as the stress Ca applied to the piece of armor is less than a "threshold" stress Sc. Beyond the threshold stress, it deforms plastically. After a stress Ca lower than the threshold stress Sc has been applied and the deformation sensor has returned to rest (absence of applied stress) the sensor therefore regains its initial geometry as long as the threshold stress has not been reached or exceeded.

According to the invention, the deformation sensor begins to deform plastically before the stress Ca applied to the armor plate reaches the minimum damaging stress $Ce_{min}$. In other words, $Cs < Ce_{min}$. If a stress Ca greater than or equal to the minimum damaging stress $Ce_{min}$ is applied, the deformation sensor therefore deforms plastically and thus maintains a "physical memory" of this application. As described hereinafter, the property measured in step 3) then, by means of the calibration curve, makes it possible to detect that such a stress has been applied and therefore that the piece of armor is damaged.

The threshold stress Cs must not, however, be too far removed from the minimum damaging stress. This is because any exceeding of the threshold stress by the applied stress leads to irreversible damage to the deformation sensor. This is why $(Ce_{min} - Cs)/Cs$ needs to be less than 20%, and preferably as low as possible.

The tolerance $(Ce_{min} - Cs)/Cs$ is, however, dependent on the target application. In particular, if $Ce_{min}$ is different than Cs, the plastic deformation of the deformation sensor begins before the piece of armor becomes damaged. Thus, the deformation sensor can be used to physically log the occurrence of stresses that do not damage the piece of armor, for example stresses heralding damaging stresses, or more generally occurrences of stresses that have left no trace on the piece of armor. The deformation sensor thus, for example, allows monitoring of the aging of the piece of armor that is not visible on the piece of armor. In one embodiment, $(Ce_{min} - Cs)/Cs > 5\%$, $(Ce_{min} - Cs)/Cs > 10\%$, $(Ce_{min} - Cs)/Cs > 15\%$.

In one embodiment, the sensor matrix is a polymer material, particularly if the piece of armor is intended to be used at a temperature below 200° C.

In one embodiment, the sensor matrix is made from a thermoplastic or a thermoset, particularly from a material described in WO2017/009256.

In one embodiment, the sensor matrix is made from a ceramic material, particularly if the piece of armor is intended to be used at a temperature above 200° C. As a preference, the sensor matrix is made from a ceramic material resistant to a temperature of 1500° C.

The deformation sensor may be manufactured in situ. The sensor matrix is then preferably directly in contact with the piece of armor:

In one embodiment, a liquid precursor of the sensor matrix filled with nanofillers (which is to say one which, after curing, yields said matrix) is applied to the piece of armor then cured, preferably by drying, to form the nanofiller-filled sensor matrix. The precursor liquid may be applied to the piece of armor by any means, for example by hand, particularly with a glue gun, or automatically. All the known methods for applying a liquid may be used.

The deformation sensor may alternatively be manufactured by applying a precursor film of a nanofiller-filled ceramic matrix to the piece of armor and then sintering this film at 1000° C. in a neutral atmosphere.

The deformation sensor may also be manufactured before being fixed to the piece of armor.

The deformations sensor may notably have the form of a sintered thin plate made of a nanofiller-filled ceramic matrix and which is bonded using a refractory adhesive to the piece of armor before use.

In an alternative embodiment, the deformation sensor has the form of a patch, which is to say comprises a thin support 8, preferably of a thickness less than 5 mm, preferably less than 2 mm, preferably less than 1 mm, for example a tape or a ply which can be fixed to the piece of armor and which bears the sensor matrix 4 containing the nanofillers 6 (FIG. 2).

The support 8 may have a surface area in excess of 10 mm by 10 mm and a thickness less than 1 mm, or even less than 500 microns.

One face of the support may be coated with an adhesive so that it can be easily fixed to the piece of armor.

WO2017/009256 describes a deformation sensor which preferably takes the form of a patch. However, the patch of WO2017/009256 is recommended for monitoring the deformation of fabrics such as the sails of boats or for anticipating the breakage of blades, masts of wind generators, wings, airplane sections, masts, floats, sailboat hydrofoils, car chassis or body shells. In such applications, the part to which the patch is fixed is conventionally not brittle. The patch may advantageously monitor and measure the deformations of this part. However, testing has demonstrated that the patch described in WO2017/009256 is not suitable for monitoring damage to brittle components. This is because its behavior actually remains elastic up to the point at which the piece of armor breaks.

That patch or, in general, any patch the behavior of which remains elastic up to the point at which the piece of armor breaks, may, however, be used by fixing the support to an interface layer 9 that displays plastic deformation as the piece of armor approaches its break point. The interface layer is therefore fixed to the piece of armor (FIG. 2).

The assembly made up of the patch 4-6-8 and of the interface layer 9 therefore forms a deformation sensor 2 suited to the invention.

The interface layer 9 may in particular be an adhesive including a thermosetting, thermoplastic or crosslinkable elastomer polymer. As a preference, when the polymer is a thermosetting polymer, its degree of crosslinking is greater than 75% or even greater than 90%. As a preference, when the polymer is a thermoplastic, its degree of crystallinity varies from 0% to 80%. As a further preference, the adhesive includes more than 50% by mass of polymer(s) (polyurethane, epoxy) or of geopolymer(s).

The thickness of the interface layer 9 applied between the patch and the piece of armor is preferably constant, preferably greater than 0.1 mm and/or less than 2 mm, preferably less than 1.5 mm. As a preference, the interface layer is extended over the entire surface area of the patch that presses against the piece of armor.

The nature of the interface layer 9 is suited to the behavior of the piece of armor. Advantageously, the one same patch can thus be used for different pieces of armor, modifying only the interface layer 9.

As a preference, the interface layer 9 has a "deformation/tensile stress" curve close to that of the piece of armor, at least in the temperature domain in which the piece of armor is intended to be used, and preferably from ambient temperature onward. The interface layer therefore deforms in the same way as the piece of armor.

Of course, the interface layer is chosen not to break before the start of damage to the piece of armor.

In order to select an interface layer, said patches may be bonded to pieces of armor using different adhesives, in order to form identical test pieces, and then the one that allows the deformation sensor to maintain elastic behavior up to the stresses as close as possible to the minimum damaging stress and then adopt a plastic behavior beyond the minimum damaging stress can be chosen.

The person skilled in the art knows how to modify the elastic limit of an adhesive. In general, the behavior of an adhesive can be modified by adjusting its composition, for example by modifying its quantity of organic materials (thermosetting, thermoplastic polymers or crosslinking elastomers), accelerants, retardants or thinners. It is also possible to fill it, particularly using an elastomer filler or a filler made up of polymer or mineral fibers.

As a preference, the deformation of the deformation sensor 2 is guided by the deformation of the sensor matrix 4 and/or by the deformation of the interface layer 9. In other words, the deformation sensor deforms elastically or plastically according to whether the sensor matrix and/or the interface layer is/are deforming elastically or plastically respectively.

As a preference, whether or not the deformation sensor is manufactured in situ, it has an electrical property that can vary according to its geometry, for example its elongation.

As a preference, the deformation sensor is passive, which is to say that it contains no source of energy. The deformation sensor may in particular form an electrically conducting circuit that is closed on itself, preferably configured in such a way as to be readable using magnetic induction.

As a further preference, the deformation sensor comprises connection terminals 18 that are provided to facilitate the coupling of measurement equipment 16.

An electrically resistive deformation sensor advantageously allows simple real-time measurement merely by measuring a resistance (or, which is equivalent, an electrical resistivity).

The deformation sensor is not, however, necessarily a sensor of which an electrical property is measured. In one embodiment, the deformation sensor includes "micropiezos" which have an acoustic impedance that can vary according to the geometry of the sensor. This type of sensor, of the "SAW" (surface acoustic wave) type requires the application of stressing, for example in the form of mechanical energy, in order to cause the piece of armor to vibrate, and then the measurement of the attenuation of the acoustic signal in the piece of armor.

The surface of the piece of armor 10 to which the deformation sensor 2 is fixed may be any surface of the piece of armor 10 provided that, in service, it experiences the mechanical stresses capable of damaging the piece of armor.

As a preference, the surface area on which the deformation sensor is fixed represents more than 10%, preferably more than 30%, preferably more than 50% of the impact surface area $S_i$ of the piece of armor, which is to say of the surface area liable to be impacted by the projectiles 36 in the service position.

In the particular embodiment in which the piece of armor is an armor plate of a bulletproof vest, the deformation sensor 2 may be placed within the material of the cover, as depicted in FIG. 4A, between the cover and the impact surface of the armor plate 32, as depicted in FIG. 4B, between the armor plate 32 and the intermediate layer 33, as depicted in FIG. 4C, and preferably in the intermediate layer 33 as depicted in FIG. 4D, or between the intermediate layer 33 and the shock absorbing backing plate 34, as depicted in FIG. 4E.

As a preference, the deformation sensor is incorporated into the adhesive that fixes the intermediate layer 33 to the armor plate 32 and/or into the adhesive that fixes the intermediate layer 33 to the shock absorbing backing plate 34 and/or into the adhesive that fixes the cover 30 to the armor plate 32 and/or into the adhesive that fixes the cover 30 to the shock absorbing backing plate 34.

Said adhesive may in particular constitute an interface layer interfacing with a patch or may constitute a said matrix, as described above.

Kit

A kit according to the invention includes a device according to the invention and measurement equipment 16 suitable for measuring the property in step 3), for example by means of cables connecting it to connection terminals 18 of the deformation sensor (FIG. 1). As a preference, the measurement equipment 16 is suitable for measuring the property contactlessly.

The measurement equipment 16 is also connected to analysis equipment 22, which is to say equipment conventionally including a processor, a computer memory, and software which are configured to determine, from the property measured, a condition of the piece of armor.

The measurement equipment 16 may be physically integrated into the analysis equipment.

Method

The method of manufacture can be derived directly from the foregoing description.

In step 1), a deformation sensor 2 is fixed to a piece of armor 10 so as to constitute a device according to the invention, for example of the type depicted in FIG. 2.

In step 2), the device is calibrated, which is to say that a relationship, which can be represented in the form of a calibration curve 24 providing, for each possible response of the deformation sensor 2, information as to the physical condition of the piece of armor, particularly the damage sustained by same, and preferably information regarding the amplitude of the damage, is determined.

Calibration is preferably performed at a reference instant prior to the first entry of the device according to the invention into service.

As a preference, the calibration is performed on test specimens identical to the device according to the invention and which each experience a particular stress. Any damage that the piece of armor might sustain is then observed. As a preference, any damage there might be is measured, preferably contactlessly, preferably using X-rays, ultrasound or a method involving resonance.

For example, by applying stresses of increasing intensity, the minimum damaging stress beyond which any stress leads to damage to the piece of armor is detected, together with the corresponding response of the deformation sensor.

The inventors have discovered that a very small amount of damage, for example microcracking, leads to measurable deformation of the deformation sensor. In the region of the calibration curve that corresponds to plastic deformation of the deformation sensor, it is therefore advantageously possible to establish a relationship between a measurement of said property and the amplitude of the damage.

In step 3) the deformation sensor 2 is interrogated at the updated instant and using the measurement equipment 16 in order to measure a property the value of which is dependent on the geometry of the deformation sensor.

The interval of time between the calibration instant and the updated instant may be greater than a week, two weeks, one month, two months and/or less than one year or six months.

Step 3) can be carried out at regular intervals.

If said property is an electrical resistance of the nanofiller-filled sensor matrix, the two cables of the measurement equipment 16, which is conventionally an ohmmeter, are connected to the connection terminals 18 in the usual way (FIG. 1).

Connection of the measurement equipment to the connection terminals can be deactivatable, and this is of notable benefit when the checking of the piece of armor is performed at discrete intervals. It may be non-deactivatable, which is to say permanent, particularly when the checking is performed substantially continuously.

In one preferred embodiment, the measurement of said property is performed without contact with the deformation sensor. In particular, the property may be an inductance, which can be measured from a distance in the conventional way.

The measurement M performed by the deformation sensor, or "updated property", is then analyzed by the analysis equipment 22 connected to the measurement equipment 16 so as to provide information regarding any damage that the piece of armor may have sustained. More specifically, the analysis equipment uses the calibration curve 24 to determine information as to the damage E sustained by the piece of armor.

As a preference, if the updated property is within a range that corresponds to applied stresses that lead to elastic deformation of the deformation sensor, the condition of the piece of armor is considered to be "satisfactory". If not, that is to say if the updated property is within the range that corresponds to applied stresses leading to plastic deformation of the deformation sensor, the condition of the piece of armor is considered to be "unsatisfactory". In the latter instance, the calibration curve makes it possible to evaluate the level of damage. The condition of the piece of armor may then for example be qualified as "lightly cracked", "moderately cracked" and "severely cracked", according to the value of the updated property.

Depending on the condition thus determined of the piece of armor, it is possible to identify the type of defect in the piece of armor and/or to decide whether the piece of armor remains usable or whether it needs to be replaced and/or to schedule maintenance operations.

In one embodiment, the physical conditions determined according to the invention are statistically processed, for example using artificial intelligence algorithms, so as to improve decision-making.

NONLIMITING EXAMPLES OF APPLICATIONS AND TESTS

FIG. 7 illustrates the deformation c of a piece of armor (solid line) and of the deformation sensor (broken line) as a function of the stress Ca applied to the piece of armor.

$C_{rM}$ denotes the breaking stress of the piece of armor and $\varepsilon_{rM}$ denotes the maximum deformation, corresponding to rupture of the piece of armor. It is considered that the end of the elastic-deformation domain and the start of the plastic-deformation domain for the piece of armor are defined by $Ce_{min}$, so stresses greater than or equal to $Ce_{min}$ lead to damage to the piece of armor.

$Cr_c$ denotes the stress applied to the piece of armor and that leads to breakage of the sensor. (In practice, the breakage of the piece of armor may lead to breakage of the sensor). $\varepsilon_{rC}$ denotes the maximum deformation of the sensor, corresponding to the rupturing thereof (assuming that the breakage of the piece of armor has not damaged the sensor).

Cs denotes the threshold stress, the deformation of the deformation sensor being elastic or plastic according to whether the stress applied to the piece of armor is below, or above or equal to Cs, respectively. $\varepsilon_s$ denotes the deformation of the deformation sensor when the threshold stress is applied.

The parts of the curves that correspond to plastic deformation are in bold.

It is found that, as a preference, the plastic deformation of the piece of armor does not occur until the deformation sensor has itself experienced plastic deformation. Any damage to the piece of armor is then remembered by the deformation sensor.

The minimum damaging stress for the piece of armor $Ce_{min}$ is less than the stress $Cr_c$ applied to the piece of armor and that leads to breakage of the deformation sensor.

As a preference, the plastic deformation of the deformation sensor begins, however, while the piece of armor is still experiencing elastic deformation. The deformation sensor can thus remember a stress that is high but has not however led to damage to the piece of armor.

As a preference, the domain of plastic deformation of the deformation sensor ends after the piece of armor has broken. The deformation sensor can thus remember any stress that has led to damage to the piece of armor.

FIG. 7 illustrates how the deformation sensor reacts under the application of an increasing stress Ca applied to the piece of armor: it first of all deforms elastically, until a threshold stress Cs is applied to the piece of armor (fine broken line, up to the deformation $\varepsilon_s$) and then deforms plastically.

In particular, the deformation of the deformation sensor is plastic when the stress applied to the piece of armor reaches $Ce_{min}$ and at the same time the piece of armor begins to degrade. This plastic deformation of the deformation sensor makes it possible, if the stress disappears, to maintain a trace that stresses leading to damage of the piece of armor have been reached.

If the stress continues to increase, it causes plastic deformation of the piece of armor, in addition to the plastic deformation of the deformation sensor. It for example reaches the stress $C_1$ corresponding to the deformation $\varepsilon_1$. When the stress then decreases to the point of disappearing, this plastic deformation is manifested in a residual deformation (permanent set) $\varepsilon_2$ of the deformation sensor, which thus remembers the application of the maximum stress $C_1$ applied to the piece of armor.

The arrow indicates the deformation of the deformation sensor when the stress ceases after having reached $C_1$ greater than $Ce_{min}$, and shows that the plasticity of the deformation sensor has remembered the damage to the piece of armor.

If the stress continues to increase, it reaches $Cr_M$ and the piece of armor breaks.

$Cr_c$ denotes the stress applied to the piece of armor and that leads to breakage of the deformation sensor if the piece of armor has not broken. (In practice, the breakage of the piece of armor generally causes the deformation sensor to break).

Detection of Stress Occurrence and Evaluation of the Amplitude of Said Stresses

Three resistive deformation sensors QRS in the form of patches supplied by the company Sense-In, were bonded, using a two-part epoxy resin supplied by Elantas under the reference ElanTech AS89.1/AW89.2, to the rear faces of respective pieces of armor in the form of square plates with a size length of 200 mm made of silicon carbide, 7.5 mm thick. In each instance, the deformation sensor was positioned 45 mm from one edge of the plate and 25 mm from an adjacent edge.

A textile intermediate layer made of aramid was then bonded to each said rear face using an epoxy resin.

A shock absorbing backing plate made of a thermoplastic composite was finally bonded to each said intermediate layer to make three protective plates of a first series of examples. Each protective plate was then placed inside a textile cover made of aramid which was closed to enclose the protective plate and constitute a protective shield, as depicted in FIG. 4C.

Various stresses were applied to the various protective shields:

The first protective shield was subjected to impact of a ball of paper weighing approximately 2 g, fired at around 10 m/s at the center of the front face of said shield and perpendicular to said impact face. The second protective shield experienced the impact of a steel ball weighing approximately 30 g, fired at approximately 50 m/s at the center of the front face of said shield and perpendicular to said impact face. The third protective shield, of a mass of 50 kg, was dropped from a height of 50 cm onto the center of the front face of said shield and perpendicular to said impact face.

The resistance of the deformation sensor was measured continuously using an HBM MX840A acquisition sensor with wired connection.

FIG. 5 shows the relative variations in resistance (Ar %) recorded for the first, second and third protective shields (5A, 5B and 5C respectively), over the course of time, in seconds.

The artefact corresponds in each instance to the application of the stress (short-lived shock). X-ray analysis performed using a detection equipment of the HI-SCAN 6046si type supplied by Smiths detection revealed no visible defect on the piece of armor of the first protective shield. The stress was too low to lead to plastic deformation of the deformation sensor. FIG. 5A however does show the high sensitivity of the deformation sensor.

An observation of the second protective shield with the naked eye revealed no start of cracking. However, damage was detectable by X-ray measurement, with a crack 15 mm long. FIG. 5B shows that the resistance after the application of the stress (the firing of the steel ball) differs from the resistance prior to the application of the stress. The deformation sensor has thus advantageously maintained a trace of the firing of the steel ball having occurred. It also is able to detect damage not visible to the naked eye.

Observation of the piece of armor of the third protective shield with the naked eye revealed significant cracking. FIG. 5C shows that the resistance after application of the stress (dropping) is markedly different than the resistance prior to the application of the stress. The deformation sensor has thus maintained a trace of the drop having occurred.

These tests show that the deformation sensor advantageously allows the occurrence of light shocks on the armor plate, for example those experienced while the protective shield is being transported, or shocks that have led to damage not visible without recourse to X-ray to be remembered. Furthermore, measuring the resistance does not require a study of the piece of armor, and in particular does not require it to be extracted from the cover provided that access to the connecting terminals can be had.

The stresses $Ce_{min}$ and Cs were determined as follows:

Test specimens indicative of series production are subjected to increasing stresses Ca, resulting from the firing of a projectile at the center of the front face of the specimen, perpendicular to said front face.

The stress Ca is dependent on the mass m of the projectile, on the surface area S over which the projectile impacts the front face, and on the acceleration A measured on the front face of the piece. It is calculated as follows: Ca=m×A/S, Ca being expressed in MPa, m in kg, A in m/s$^2$ and S in mm$^2$.

The mass of the projectile is determined using a balance of milligram precision.

The impact surface area is measured using a rule on the piece after impact and corresponds to the trace left by the projectile on the aramid textile cover. When this is not visible, prior to the firing step, the cover is marked with graduations so that a high speed camera can determine the impact area with precision (to within an mm).

The acceleration is measured by an accelerometer consisting of a cell bonded to the front face, or "impact face", of the test specimen. This is bonded at a distance of 100 mm away from the point of impact.

After a stress has been applied, the test specimen is analyzed by X-ray.

The minimum damaging stress $Ce_{min}$ has been estimated as being the stress Ca beyond which a defect at least equal to 2 mm can be detected by X-ray radiography.

The threshold stress Cs was determined by reading the variation in electrical resistance of the deformation sensor as being the stress beyond which the variation in electrical resistance is no longer reversible although the piece following X-ray inspection is not damaged, namely beyond which the deformation sensor no longer returns to the initial dimensions it had prior to application of the stress.

The ratio $Ce_{min}/Cs$ was evaluated at 1.1 in the context of the example shield device as described hereinabove, with a square plate of side length 200 mm, made of silicon carbide, 7.5 mm thick.

Detection of Failure of a Deformation Sensor

The measurement performed at step c) makes it possible to detect failure of the deformation sensor. In particular, if a deformation sensor does not supply a property that is consistent with the property or properties of one or more other deformation sensors, preferably likewise placed on the piece of armor, it may be considered to be defective. For example, the electrical resistance of one deformation sensor may be compared with that of an adjacent sensor.

Failure of a deformation sensor may also be detected by monitoring the way in which the property that it supplied evolves over different updated instants.

Detection, Measurement and Location of Stresses, Particularly Mechanical Shocks

The amplitude of the plastic deformation of the deformation sensor depends on the amplitude of the shock experienced, which is itself dependent on the distance between the deformation sensor and the zone of application of the shock to the piece of armor.

Knowledge of the position of several deformation sensors on the piece of armor and of the updated properties that they supply thus makes it possible to evaluate the position of the zone of application of the shock, or "point of impact".

It also makes it possible to determine a distribution of the stresses experienced by the piece of armor.

For example, in the embodiment of FIG. 6A, assuming that the four deformation sensors $6_1$, $6_2$, $6_3$ and $6_4$ are identical and uniformly spaced, if the updated properties, for example the updated resistances, measured for deformation sensors $6_1$ and $6_2$ are equal and at the same time the updated property from the deformation sensor $6_3$ is lower than that of the deformation sensors $6_1$ and $6_2$ and higher than that of deformation sensor $6_4$, it may be considered that the point of impact (indicated by a cross) lies on a line (depicted in broken line) midway between the deformation sensors $6_1$ and $6_2$.

With a setup such as that of FIG. 6B it is possible, by comparing the updated resistances of the four deformation sensors, to determine the position of the point of impact even more precisely. For example, if the updated properties of the four deformation sensors $6_1$, $6_2$, $6_3$ and $6_4$ are identical, then the point of impact is at the center of the rectangle defined by the deformation sensors.

In the embodiment of FIG. 6C, the deformation sensor takes the form of a substantially closed, but still open, loop. Several updated properties can be mentioned on several portions of the deformation sensor, for example between the points $P_1$ and $P_2$, between the points $P_3$ and $P_4$, between the points $P_5$ and $P_6$, and between the points $P_7$ and $P_8$. As with the embodiments of FIGS. 6A and 6B, a comparison of these updated properties allows the position of the point of impact to be determined.

In these embodiments, in order to evaluate the location of a point of impact, a comparison of the updated properties against the properties measured prior to the updated instant is not needed.

As a preference, the effect that a stress has on a deformation sensor is analyzed as a function of the conditions of application of the stress and of the position and shape of the deformation sensor.

As a preference, a model is established to make it possible to determine the effect of a predetermined stress on the property of a deformation sensor, according to the position of the deformation sensor with respect to the point of application of the stress. As a preference, such a model is established by modifying the stress each time, for example by modifying the amplitude thereof.

Simple testing campaigns then make it possible to establish a relationship between a property measured with a deformation sensor and the position and/or the nature of the stress. This relationship makes it possible thereafter, in service, to interpret the updated property from a deformation sensor similar to the deformation sensor used for the testing.

For example, if the tests show that the measured property following a predetermined mechanical shock evolves linearly with respect to the distance from the point of impact, simply measuring this property after the piece of armor has been subjected to a shock will make it possible to define the zone to which the shock has been applied.

Reciprocally, if the position of the point of impact with respect to the deformation sensor is known, it is possible to determine the intensity of the shock.

Checking an Assembly

In one particularly advantageous embodiment, the deformation sensor is interposed at the interface between the piece of armor and another piece 20, which may or may not be brittle, as depicted in FIG. 8. Fixed to these two pieces, the deformation sensor 2 is advantageously able to detect and/or to measure the effect of stresses affecting each of the two pieces.

Furthermore, because the deformation sensor is bonded to each of the pieces, it deforms under the effect of a radial movement of one of these pieces with respect to the other. It can therefore be used to detect and/or measure such relative movement.

As is now clearly apparent, the invention therefore provides a method that makes it possible in a simple way to:
  detect the past application of a damaging stress to a piece of armor, for example a thermomechanical or mechanical shock;

evaluate said stress and/or said damage and/or the location of the zone of application of said thermomechanical or mechanical shock.

The invention is advantageously applicable to pieces of armor having varying geometries. Furthermore, it does not appreciably alter the bulkiness of these pieces.

Finally, it allows detection of small amplitude deformations because the deformation sensor is highly sensitive. It therefore allows the detection of weak signals, and thus makes it possible to anticipate catastrophic failure of the piece of armor even though the zone of pseudoplastic deformation (resulting from microcracking) of the piece of armor is extremely limited.

Of course, the invention is not restricted to the embodiments described and depicted, which are provided for illustrative purposes only.

In particular, the position of the deformation sensor on the piece of armor and the number of deformation sensors are not limited. The number of deformation sensors may in particular be adapted to suit the extent of the surface area of the piece of armor that is to be monitored.

Communications between the deformation sensor and the measurement equipment and/or between the measurement equipment and the analysis equipment may be performed as wired communications or as wireless communications for example using Wi-Fi or Bluetooth.

The invention claimed is:

1. A device including:
   a piece of armor, and
   a deformation sensor fixed to the piece of armor and configured to deform under the effect of a stress Ca applied to the piece of armor,
   elastically when the applied stress Ca is less than or equal to a threshold stress Cs, and plastically when the applied stress Ca is greater than the threshold stress Cs, the threshold stress being such that $Cs < Ce_{min}$,
   $Ce_{min}$ being a minimum damaging stress for the piece of armor.

2. The device as claimed in claim 1, wherein
   $(Ce_{min} - Cs)/Cs < 20\%$.

3. The device as claimed in claim 2, wherein
   $(Ce_{min} - Cs)/Cs < 10\%$.

4. The device as claimed in claim 1, wherein the minimum damaging stress is the stress beyond which the piece of armor begins to suffer from microcracking.

5. The device as claimed in claim 1, wherein the applied stress is a mechanical shock.

6. The device as claimed in claim 1, wherein the piece of armor is made of a ceramic material.

7. The device as claimed in claim 1, wherein the deformation sensor has an impedance that can vary as a function of said stress Ca applied to the piece of armor.

8. The device as claimed in claim 1, wherein the deformation sensor forms an electrically conducting circuit closed on itself and having no source of electrical energy.

9. The device as claimed in claim 1, wherein the deformation sensor comprises a sensor matrix and a collection of electrically conducting particles distributed within said sensor matrix.

10. The device as claimed in claim 9, wherein the electrically conducting particles are carbon nanotubes.

11. The device as claimed in claim 9, wherein the sensor matrix is made of a ceramic material.

12. The device as claimed in claim 9, wherein the sensor matrix is fixed to a support, the support is fixed to an interface layer and the interface layer is fixed to the piece of armor, the interface layer being configured to deform under the effect of the stress Ca applied to the piece of armor, elastically when the applied stress Ca is less than or equal to the threshold stress Cs, and plastically when the applied stress Ca is greater than the threshold stress Cs.

13. The device as claimed in claim 1, constituting a device affording protection against bullets.

14. The device as claimed in claim 1, comprising a second piece, the deformation sensor being fixed to the piece of armor and to said second piece.

15. The device as claimed in claim 14, wherein the second piece is a shock-absorbing backing plate of a bulletproof vest or an intermediate layer extending between a shock absorbing backing plate of a bulletproof vest and the piece of armor.

16. The device as claimed in claim 1, wherein the deformation sensor is configured not to be destroyed by the application of any stress to the piece of armor that does not cause the piece of armor to fracture.

17. A method for monitoring the physical condition of the piece of armor, said method comprising the following steps:
   1) at an initial instant, fixing the deformation sensor to the piece of armor so as to form the device as claimed in claim 1;
   2) calibrating the device so as to determine a relationship between said physical condition and a property of the deformation sensor;
   3) at an updated instant, measuring said property and, from said relationship, determining said physical condition at the updated instant.

18. The method as claimed in claim 17, wherein said property is an impedance and/or said physical condition relates to the presence of microcracking.

19. The method as claimed in the claim 18, wherein, in step 2), said property is measured without contact with said deformation sensor.

20. The method as claimed in claim 18, wherein said property is a resistance.

21. The method as claimed in claim 17, wherein, in step 3), according to said measurement of said property:
   a mechanical shock experienced, prior to step 3), by the piece of armor is detected and/or an amplitude of said mechanical shock is measured and/or a location of the zone of application of said mechanical shock is determined; and/or
   a thermomechanical shock experienced, prior to step 3), by the piece of armor is detected and/or an amplitude of said thermomechanical stress is measured and/or a location of the zone of application of said thermomechanical stress is determined; and/or
   a failure of the deformation sensor is detected; and/or
   detachment of the piece of armor from another piece to which it is fixed is detected, the deformation sensor being sandwiched between the piece of armor and said other piece.

22. The device as claimed in claim 1, wherein the piece of armor is made from a material that has a domain of plastic deformation under load before breaking and an elastic deformation domain, the plastic deformation domain representing less than 1% of the elastic deformation domain.

23. The device as claimed in claim 1, wherein the piece of armor is made of a ceramic material and/or of a glass and/or of a vitreous ceramic and/or of a ceramic matrix composite and/or of a ceramic-metal composite.

* * * * *